United States Patent [19]
Laederach et al.

[11] Patent Number: 5,917,001
[45] Date of Patent: Jun. 29, 1999

[54] LENS FOR LIGHTING SYSTEMS

[75] Inventors: Susanne Laederach; Hans Dalla Torre, both of Domat/Ems, Switzerland

[73] Assignee: EMS-Inventa AG, Zürich, Switzerland

[21] Appl. No.: 08/706,714

[22] Filed: Sep. 6, 1996

[30] Foreign Application Priority Data

Sep. 12, 1995 [DE] Germany ............... 295 14 658

[51] Int. Cl.$^6$ .................. C08G 73/10
[52] U.S. Cl. ............. 528/322; 528/310; 528/324; 528/330; 528/331; 528/339; 528/340; 528/346; 528/347; 525/419; 525/420; 525/432; 264/1.1; 264/1.29; 264/1.32
[58] Field of Search .............. 528/322, 310, 528/324, 330, 331, 339, 340, 346, 347; 525/419, 420, 432; 264/1.1, 1.29, 1.32

[56] References Cited

U.S. PATENT DOCUMENTS

| | | | |
|---|---|---|---|
| 4,898,896 | 2/1990 | Maj et al. | 528/323 |
| 5,177,178 | 1/1993 | Thullen et al. | 528/339.3 |

OTHER PUBLICATIONS

Abstract of Japan, JP04214751–A, Aug. 5, 1992.
Abstract of Japan, J02070712–A, Mar. 9, 1990.
Abstract of Japan, JP06322093–A, Nov. 22, 1994.
Abstract of Japan, JP07053430–A, Feb. 28, 1995.
Abstract of Japan, JP06200005–A, Jul. 19, 1994.
Abstract of Japan, JP06172508–A, Jun. 21, 1994.
Abstract of Japan, JP06145317–A, May 24, 1994.
Abstract of Japan, US5319149–A, Jun. 7, 1994.
Abstract of Japan, US5306832–A, Apr. 26, 1994.
Abstract of Japan, JP06263863–A, Sep. 20, 1994.
Abstract of Japan, JP06239781–A, Aug. 30, 1994.
Abstract of Japan, JP5331277–A, Dec. 14, 1993.
Abstract of Japan, JP05194719–A, Aug. 3, 1993.
Abstract of Japan, JP05078567–A, Mar. 30, 1993.
Abstract of Japan, JP05078467–A, Mar. 30, 1993.
Abstract of Japan, WO9211319–A1, Jul. 9, 1992.

*Primary Examiner*—Duc Truong
*Attorney, Agent, or Firm*—Browdy and Neimark

[57] ABSTRACT

An uncoated lens, especially for use as the lens of a fog light or a headlight for an automobile, and having particularly good resistance against the environmental effects which are inherent in this environment, is formed of a colorless, transparent copolyamide having a glass transition temperature of at least a 170° C., blended with a homopolyamide, and wherein the copolyamide is formed from at least one cycloaliphatic diamine with two cyclohexane rings, and at least one aromatic dicarboxylic acid which is predominantly isophthalic acid. The copolyamide may optionally contain up to 20 mol % of a further polyamide forming monomer of at least one lactam or an omega-aminocarboxylic acid. The homopolyamide is preferably one of PA6, PA11, PA12, PA66, PA69, PA610 or PA612. The cycloaliphatic diamine of the copolyamide is preferably bis(3-methyl-4-aminocyclohexyl)-methane.

21 Claims, No Drawings

LENS FOR LIGHTING SYSTEMS

FIELD OF THE INVENTION

The invention relates to an uncoated lens made of colorless, transparent copolyamides or their blends with homopolyamides. The invention in particular relates to a novel lens made of a novel material for lighting systems, such as are represented by automobile headlights, which has a particularly good resistance against the environmental effects which are inherent in its employment.

BACKGROUND OF THE INVENTION

Materials for thermoplastic lenses are known from, for example, the references JP 06 322039-A, JP 07 053430-A, U.S. Pat. No. 5,409,975, JP 06 172508-A, JP 06 145317-A, U.S. Pat. No. 5,319,149, U.S. Pat. No. 5,306,832, JP 06 263863-A, JP 06 239781-A, JP 05 331277-A, JP 05 194719-A, JP 05 078567-A, JP 05 078467-A, WO 92/11319-A1, JP 04 214751-A and JP 02 070712-A.

Aromatic copolymer-polycarbonates are described in these references which, because of their high glass transition temperatures, their good transparency and their easy working properties, are suitable for lenses. The disadvantage of such polycarbonates lies in their insufficient UV resistance and inadequate scratch resistance and surface hardness. For these reasons lenses made of polycarbonates cannot be practically employed without special protective layers.

Such protective layers and their application to a polycarbonate substrate are also known, for example from the references EP 588 508-A1, JP 07 108560-A, DE 692 00 870-E, U.S. Pat. No. 5,008,148, JP 60 250925-A, JP 06 206231-A, DE 42 38 279-A1, JP 05 093170-A and JP 93 069845-B.

An illustrative impression regarding the latest prior art in connection with automobile headlight lenses is provided by an article published in the magazine K Plastic&Kautschuk, No. 17 of Aug. 25, 1995, page 13, Giesel, publishers, Isernhagen/Hannover (Germany). It can be seen from this that large investments in elaborate production installations are made for coating polycarbonate lenses.

An essential disadvantage of the described protective coatings or "hard coats" lies in that they make the final product more expensive and that relatively large amounts of scrap are generated during back-spraying of protective foils or during coating with hard coats. Coating is only suitable for relatively flat and simple parts so that blinkers, for example, cannot be integrated into a headlight structure for automobiles without special arrangements.

A particular danger lies in the crack formation of the protective layer during use, so that the coating can become partially separated from the substrate. This effect makes the lens look dirty and cloudy and allows the entry of chemical substances, for example road salt, between the protective layer and the substrate, which results in the dimming of the lens.

Also, scratch-resistant coatings in accordance with the prior art only cover the edges of the formed parts insufficiently. This is an additional source of the above mentioned resulting damages.

OBJECT AND SUMMARY OF THE INVENTION

It is therefore the object of the invention to develop a lens for lighting systems wherein coating of the substrate is omitted and the above mentioned disadvantages of the prior art are overcome.

This object is attained by an uncoated lens made of a colorless, transparent copolyamide or a blend thereof with a homopolyamide, characterized in that the copolyamide is essentially constituted of a) at least one cycloaliphatic diamine having at least two cyclohexane rings and no more than 24 C-atoms in a nearly equimolar ratio with b) at least one aromatic dicarboxylic acid with 8 to 16 C-atoms, and c) up to 20 mol-% of further polyamide-forming monomers of at least one lactam or an omega-aminocarboxylic acid or the approximately equimolar mixture of at least one aliphatic diamine and an aliphatic dicarboxylic acid having 6 to 12 C-atoms, that the copolyamide has a glass transition temperature of at least 170° C. up to 230° C., and optionally contain process- and/or use-related additives; and wherein such a lens can be used in a lighting system, in particular for land, air and watercraft.

The object is attained in particular by the employment in accordance with the invention of the copolyamides or their blends or alloys with homopolyamides as novel materials.

The lens in accordance with the invention is used in the entire range of employment of lighting systems for means of conveyance, such as vehicles of all types, in lighting systems for traffic control, such as signal installations for road, air and ship traffic, and in optical devices.

Preferred applications are (front) headlights, fog lights, blinkers and signal lights.

In an advantageous manner and in contrast to the prior art, the lenses in accordance with the invention are distinguished by special scratch resistance and surface hardness, so that a hard coat application becomes superfluous. Further advantages lie in the high transparency and the particularly good UV resistance.

DETAILED DESCRIPTION

The glass transition temperatures (Tg) of the copolyamides employed in accordance with the invention of at least more than 170° C., preferably between 170 to 230° C., assure high thermoforming stability. Blends or alloys of these copolyamides with up to 30 weight-% of aliphatic homopolyamides from the group PA6, PA11, PA12, PA66, PA69, PA610 and PA 612 have improved resistance to chemicals and stress cracking without losing rigidity, stability or thermoforming stability in the process. The abbreviation PA is a standard art-recognized abbreviation for polyamide or nylon, e.g. PA6 is the same as nylon 6, i.e. a homopolymer of epsilon-caprolactam; and PA12 is nylon 12, a homopolymer of laurolactam.

The addition of 10 weight-% of polyamide 12 to the blend is particularly preferred. Known catalysts and stabilizers are employed in the course of this.

The copolyamides and their blends can be selectively modified in a known manner and with known amounts of processing- or use-related additives from the group of chain regulators, catalysts, lubricants, stabilizers, pigments, dyes and impact strength improving agents.

Table 1 shows the properties of the lens in accordance with the invention.

The following composition is an example of a polyamide in accordance with the invention:

40 mol-% of a cycloaliphatic diamine: bis(3-methyl-4-aminocyclohexyl)-methane in the form of Laromin C260®, 40 mol-% of an aromatic dicarboxylic acid:isophthalic acid, 20 mol-% of laurolactam, and (following polymerization)

10 weight-% of polyamide 12 (PA12).

Known catalysts and stabilizers were employed.

The lens in accordance with the invention can be easily and cost-effectively produced by injection molding.

It is to be noted that the aforementioned bis(3-methyl-4-aminocyclohexyl)-methane, also known as 3,3'-dimethyl-4,4'-diaminodidyclohexyl-methane (CAS No. 6864-37-5) is a cycloaliphatic diamine monomer having two cyclohexane rings. This monomer unit falls within the type designation MACM.

TABLE 1

| Property | Unit | Invention |
|---|---|---|
| Glass Transition Temp. | [° C.] | 175 |
| HDT*/A [1,82 N/mm$^2$] | [° C.] | 139 |
| HDT*/B [0,46 N/mm$^2$] | [° C.] | 154 |
| Scratch Resistance acc. to Taber DIN 52347 | [mg] | 28,4 |
| Surface Hardness (Erichsen) | [g] | >700 |
| Chemical Resistance | [—] | |
| - Gasoline | | resistant |
| - Antifreeze | | partially resistant |
| - Windshield Washer Fluid | | resistant |
| - Motor Oil | | resistant |
| Impact Resistance at 23° C. | [kJ/m$^2$] | 45,0 |
| Notch Impact Strength at 23° C. | [kJ/m$^2$] | 2,0 |

*HDT = Heat Distortion Temperature

What is claimed is:

1. An uncoated lens made of a blend of a colorless, transparent copolyamide with a homopolyamide, characterized in that the copolyamide is essentially constituted of
   a) at least one cycloaliphatic diamine having at least two cyclohexane rings and no more than 24 C-atoms in a nearly equimolar ratio with
   b) at least one aromatic dicarboxylic acid with 8 to 16 C-atoms consisting essentially of isophthalic acid, and
   c) optionally up to 20 mol-% of a further polyamide-forming monomer of at least one lactam or an omega-amino-carboxylic acid or the approximately equimolar mixture of at least one aliphatic diamine and an aliphatic dicarboxylic acid having 6 to 12 C-atoms,
   that the copolyamide has a glass transition temperature of at least 170° C. up to 230° C., and optionally contains process-related additives, use-related additives, or both process- and use-related additives, and
   that said homopolyamide is present in said blend in an amount up to a maximum of 30 wt % sufficient to provide said blend with improved resistance to chemicals and stress cracking without losing rigidity, stability or thermoforming stability.

2. The lens in accordance with claim 1, characterized in that the homopolyamide is selected from the group consisting of PA6, PA11, PA12, PA66, PA69, PA610 and PA612.

3. The lens in accordance with claim 1, characterized in that the cycloaliphatic diamine is singly or multiply substituted by methyl, ethyl or isopropyl groups at the rings.

4. The lens in accordance with claim 3, characterized in that the substituted cycloaliphatic diamine is bis(3-methyl-4-aminocyclohexyl)-methane.

5. The lens in accordance with claim 1, characterized in that the aromatic dicarboxylic acid further comprises at least one of terephthalic acid and naphthalene dicarboxylic acid.

6. The lens in accordance with claim 1, wherein said further polyamide-forming monomer is present as a lactam of decanolactam or dodecanolactam.

7. The lens in accordance with claim 1, characterized in that said blend is selectively modified with processing- or use-related additives selected from the group consisting of chain regulators, catalysts, lubricants, stabilizers, pigments, dyes and impact strength improving agents.

8. The lens in accordance with claim 1, characterized in that the copolyamide is constituted of approximately 40 mol-% of bis(3-methyl-4-aminocyclohexyl)-methane, approximately 40 mol-% of isophthalic acid, approximately 20 mol-% of laurolactam, and that 10 weight-% of polyamide 12 are contained in the lens body.

9. The lens in accordance with claim 1, in the form of an injection molded lens.

10. A lighting system, in particular for land, air and water craft, characterized in that it contains a lens in accordance with claim 1.

11. The lighting system in accordance with claim 10, characterized in that it is a fog light.

12. The lighting system in accordance with claim 10, characterized in that it is a front headlight.

13. The lens of claim 1 formed of a blend of said copolyamide and about 10 weight-% of PA12 as said homopolyamide.

14. A lighting system, in particular for land, air and water craft, characterized in that it contains a lens in accordance with claim 8.

15. The lighting system in accordance with claim 14, characterized in that it is a fog light.

16. The lighting system in accordance with claim 14, characterized in that it is a front headlight.

17. The lens according to claim 1, wherein said up to 20 mol-% of further polyamide-forming monomers is present in an amount of 1 to 20 mol-%.

18. The lens according to claim 1, wherein said copolyamide consists essentially only of said (a) and said (b).

19. The lens according to claim 1, wherein said copolyamide is formed of bis(3-methyl-4-amino cyclohexyl)-methane and said isophthalic acid, and optionally up to 20 mol % of laurolactam.

20. In a method of forming a plastic lens comprising
   molding a thermoplastic material to a lens shape, the improvement wherein
   said thermoplastic material is a blend of colorless, transparent copolyamide with up to 30 wt % of a homopolyamide, said copolyamide being essentially constituted of
   a) at least one cycloaliphatic diamine having at least two cyclohexane rings and no more than 24 C-atoms in a nearly equimolar ratio with
   b) at least one aromatic dicarboxylic acid with 8 to 16 C-atoms consisting essentially of isophthalic acid, and
   c) 1 to 20 mol-% of a further polyamide-forming monomer of at least one lactam or an omega-amino-carboxylic acid or the approximately equimolar mixture of at least one aliphatic diamine and an aliphatic dicarboxylic acid having 6 to 12 C-atoms,
   wherein the copolyamide has a glass transition temperature of at least 170° C. up to 230° C.

21. A method in accordance with claim 20, wherein said molding is injection molding.

* * * * *